F. K. HOLMESTED.
CONVEYING AND LOADING MECHANISM.
APPLICATION FILED JAN. 19, 1916.
1,290,200.
Patented Jan. 7, 1919.
2 SHEETS—SHEET 2.
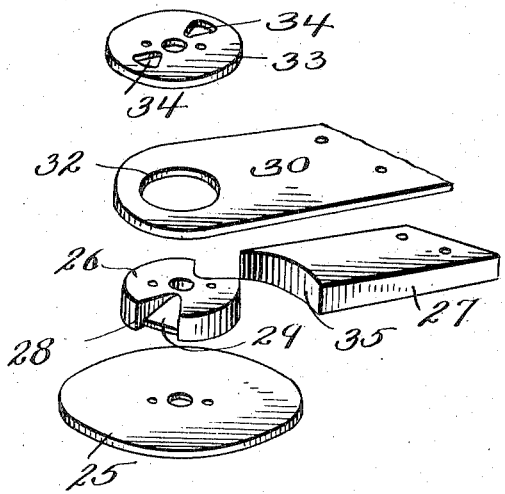
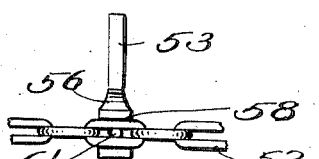
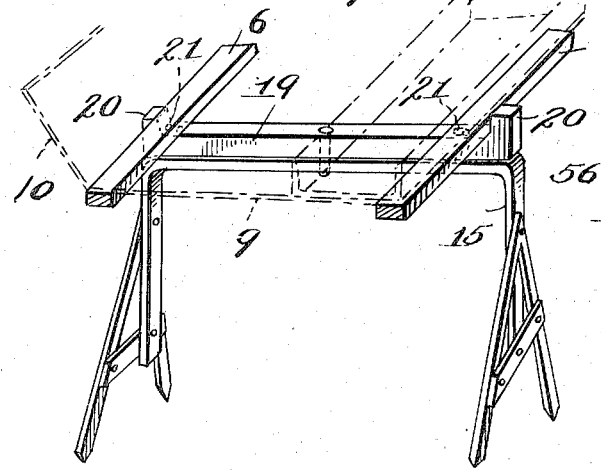
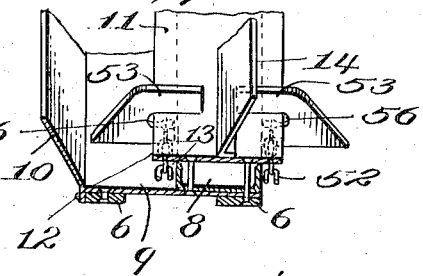
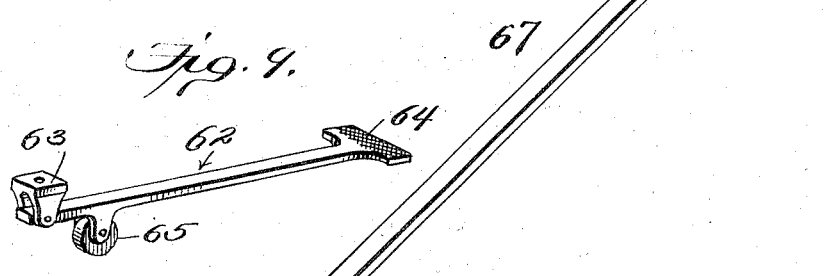
Witnesses:
Inventor
Francis K. Holmested
by
Attorney

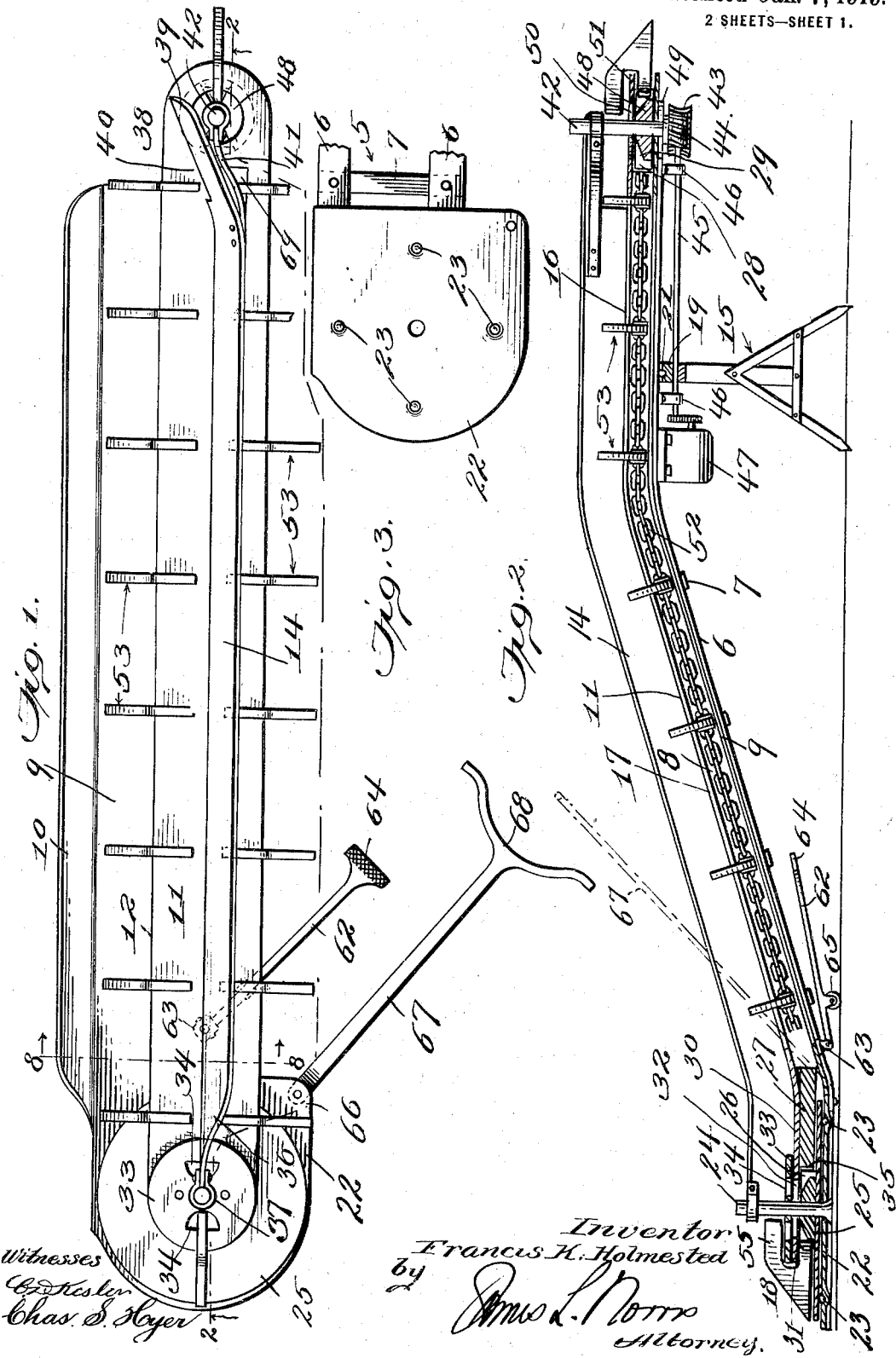

UNITED STATES PATENT OFFICE.

FRANCIS K. HOLMESTED, OF CHARLESTON, WEST VIRGINIA.

CONVEYING AND LOADING MECHANISM.

1,290,200.   Specification of Letters Patent.   Patented Jan. 7, 1919.

Application filed January 19, 1916. Serial No. 73,023.

*To all whom it may concern:*

Be it known that I, FRANCIS K. HOLMESTED, a subject of the King of Great Britain, residing at Charleston, in the county of Kanawha and State of West Virginia, have invented certain new and useful Improvements in Conveying and Loading Mechanism, of which the following is a specification.

This invention relates to loading and storing mechanism used especially in handling coal or other loose material and operable to convey coal or analogous material from a storage yard into bins, or from piles, bins or storage devices to cars or other carriers for removal from one place to another, or for transportation.

One object of the invention is to convey coal or other loose material through a trough or over a guiding frame organization of any preferred structure adapted for the purpose of conveyance by means of flights or other movable conveying elements actuated by a motive means all included in a simple and comparatively light weight organization having means at the receiving extremity for laterally shifting or moving the said extremity in various positions relatively to the coal or loose material solely by manual power and exertion and without in the least relying upon mechanical power to accomplish the same result. Another object of the invention is to provide a conveying organization for coal and loose material having an extremity placable in receiving position relatively to the coal or loose material and including a rotatable member traversed by conveyer flights or analogous devices all moving at the same or uniform rate of speed whereby pulling resistance and strain are relieved from the flights when they first engage the coal or loose material by the operation of said member which acts as a local conveyer independently of the conveyer flights until the latter flights pass the point of greatest resistance and thereby materially reduce the power necessary to move or elevate the coal or loose material over the organization from a bin, pile or storage device to a car or other carrier, and as a consequence a light weight motor may be used with efficiency.

A further object of the invention is to generally simplify and reduce the cost of manufacture of a readily portable conveying organization for coal and loose material by dispensing with trucks, supporting cars, track rails and heavy frame structures and operating and adjusting mechanisms without impairing the strength and durability of devices of this class and whereby the light organization embodying the features of the invention may be placed in operative position on the ground and adjusted or shifted as may be necessary exclusively by manual power.

As a means of demonstrating the effectiveness of a light conveying organization for coal and loose material one embodiment of the invention is illustrated in the accompanying drawings, and therein:

Figure 1 is a top plan view of conveying and loading mechanism embodying the features of the invention.

Fig. 2 is a longitudinal vertical section taken in the plane of the line 2—2, Fig. 1.

Fig. 3 is a top plan view of a portion of the receiving end of the mechanism.

Fig. 4 represents detail perspective views of parts of the receiving end of the mechanism shown detached.

Fig. 5 is a detail perspective view of a portion of the frame and particularly showing the support or trestle for the mechanism.

Fig. 6 is a detail perspective view of one of the conveyer flights.

Fig. 7 is a detail view showing one of the flights in edge elevation and the manner of attaching the same to the endless chain or analogous device therefor.

Fig. 8 is a transverse vertical section on the line 8—8, Fig. 1, showing a part of the mechanism.

Fig. 9 is a detail perspective view of a lifting and vibrating means for the receiving end of the mechanism.

Fig. 10 is a detail perspective view of a manual power applying or pressure device connected to the receiving end of the mechanism for shifting the latter.

The numeral 5 designates the frame of the machine which is preferably of skeleton form and comprises parallel side bars 6 shaped or bent to conform to the general contour of the conveying chute or trough which will be more fully hereinafter explained. The bars 6 will be reinforced at intervals by cross-ties or coupling members 7 terminally secured thereto, and the one bar 6 continues straight or is not laterally deflected throughout its length and particularly at the receiving end of the mechanism;

whereas the other bar is deflected at its lower end and attached to the terminal of the remaining bar, as clearly shown by Fig. 3. This skeleton frame 5 continues fully from the receiving end of the mechanism to the outlet end thereof, and on one bar 6 a channel bar 8 is bolted and runs from a point just in rear of the receiving end of the mechanism to a point almost fully to the outlet end. This channel bar or iron 8 provides a space means for a purpose which will be presently explained and gives rigidity as well as strength and durability to the general organization without materially adding to the weight thereof in view of its channeled formation. The chute or trough comprises a bottom plate 9 which is secured on the bars 6 and along one side edge portion of this bottom the channel iron 8 extends, as clearly shown in Fig. 8. The one side edge of the bottom plate 9 terminates coincidently with the outer side edges of the one bar 6 and the channel iron 8, and the opposite side edge of the said bottom plate terminates over and flush with the outer side edge of the remaining bar 6; and along the latter side edge of this bottom plate a flaring flange or chute side 10 is secured. The bottom of the chute or trough is completed by a plate 11 secured on the channel iron 8, said plate having the inner side edge 12 slightly projecting over the adjacent side edge of the said channel iron to form a groove or under-way 13 for the endless means of the conveyer. The opposite portion or side edge of the plate 11 projects some distance outwardly beyond the outer side edges of the channel iron 8 and the adjacent bar 6 for engagement by the flights or the conveying devices of the endless conveying means. On the plate 11 and rising above the latter is a chute or trough side 14 which completes the trough structure, the side 14 having an upward extent equal to the flange or side 10. It will be understood that all of these parts will be secured by any suitable fastening means and at such intervals as to insure stability and resistance to weight strain. The chute or trough as a whole projects upwardly over a support or trestle 15 which is clearly shown in detail by Fig. 5, the part of the chute or trough bearing upon this support or trestle being horizontal, as at 16. The chute or trough also has an outwardly inclined portion 17 which terminates at a lower horizontal receiving end 18. The inclined portion of the chute or trough merges gradually into the horizontal portion 16 thereof and the said horizontal portion of the trough is shiftably or movably held on the support or trestle 15. The chute or trough is as a whole shiftable on the support or trestle 15 by reason of the fact that the horizontal and inclined portions thereof are continuous and the receiving and discharge ends will also be similarly shifted. Moreover, the chute as an entirety may be swung laterally or in opposite sidewise directions to adjust the receiving end of the chute or trough relatively to the coal or material to be loaded or conveyed. To permit the lateral or swinging movement of the chute or trough on the trestle 15 the latter has a yoke 19 centrally fulcrumed on the top portion of the support or trestle and provided with upwardly projecting ends 20 between which the lower portion or frame of the chute or trestle is held. The outer edges of the bars 6 directly engage the inner edges of the upwardly projecting ends 20 and also bear upon the upper edge of the body of the yoke 19; and to ease the movement of the said bars 6 and of the chute or trough as an entirety, anti-frictional rollers 21 are mounted in the upper edge of the body of the yoke 19, as clearly shown by Fig. 5.

The receiving end 18 of the chute or trough comprises a bottom plate 22 which is secured to the forward connected terminals of the bars 6 which are continued thereunder, as shown by Fig. 3; and at regular intervals this bottom plate 22 has anti-frictional balls 23 mounted therein and exposed at the top portion thereof. Extending upwardly through the center of the plate 22 and also held in the extremity of the one bar 6 is a post or fixed shaft 24; and thereon is mounted a rotatable plate 25 which bears upon the anti-frictional balls 23 of the bottom plate 22, this rotatable plate 25 constituting one of the essential features of the invention and facilitating to a very large extent the feed of the loose material to the conveying means. The plate 25 is preferably circular in form, as shown in detail by Fig. 4, and immediately thereover a chain engaging disk or novel form of sprocket wheel 26 is mounted; and directly in rear of and also disposed over the plate 25 is a filling block or member 27. The chain engaging disk or sprocket 26 is secured to the plate 25 and with the latter is free to rotate on the post or shaft 24. At diametrically opposite points the disk or sprocket 26 is formed with sprocket recesses 28 having webs 29 therein with upwardly inclined surfaces, the surfaces of these webs inclining from their outer edges upwardly toward the center of the disk or sprocket 26. The webs 29 terminate at a distance from the periphery of the disk or sprocket 26 and thereby provide ample seats for the sprockets or sprocket blocks which will be hereinafter explained. Over the disk 26 and the filling block 27 is a forward extension 30 of the bottom plate 11, the said extension projecting outwardly beyond or overhanging the disk or sprocket 26, as at 31, to provide a seat for a portion of the endless conveying means, and said extension around the post or shaft 24 has an enlarged opening 32 with which the inner portions of the recesses 28 of the disk or sprocket 26 communicate. On top of the extension 30 around the post or shaft 24 is a cap plate 33 which is preferably of circular form, as shown by Fig. 4, and has diametrically opposed segmental openings 34 which register with the opening 32 and form outlets for dust and small particles working upwardly through the recesses 28 from the plate 25 and thence through the opening 32 and whereby the recesses 28 may be kept clear or relieved of accumulations of dust and dirt and facilitate the practical operation of the conveying means therewith. The cap plate 33 is secured to that portion of the extension 30 around the post or shaft 24, and the filling block 27 has the said extension secured thereto, the front edge of the filling block, as at 35, being of the same curvature as the disk or sprocket 26 so that the latter may run close to the front end of said filling block and avoid the formation of enlarged crevices or openings and at the same time solidify or strengthen the receiving end of the conveying and loading mechanism by the use of the said filling block. As clearly shown by Figs. 1 and 2, the lower end of the trough side or flange 14 is deflected inwardly, as at 36, toward the center of the receiving end 18 of the mechanism and is secured by a clip or clamping collar 37 to the post or shaft 24 and provides a guard or deflector which prevents the coal or loose material carried around by the plate 25 and the conveying means from returning to a point beyond the longitudinal center of the receiving end, said guard serving to force the coal or loose material over toward the chute or trough bottom 9 within the path of the traveling conveying devices carried by the endless conveyer. The said side or flange 14 at the discharge end 38 of the mechanism is also deflected inwardly, as at 39, at a greater angle than at the opposite end thereof to provide a discharging guard which prevents the coal or loose material from passing around the discharge end of the mechanism with the conveying devices. It is obvious that the guard 39 must give ample clearance to the conveying devices traveling around the discharge end 38 of the mechanism, and as a consequence said guard is under-cut, as at 40, see Figs. 1 and 2, and a supplemental guard strip or brace 41 is secured to the outer portion of the side or flange 14 and is also connected to an upright post or rotatable drive shaft 42 extending below the discharge end 38 and having a worm gear 43 secured thereon and held in mesh with a worm 44 on the rear end of a drive shaft 45 mounted in suitable bearings 46 depending from the lower portion of the adjacent part of the chute or trough and suitably connected up to and driven by any preferred form of motor 47 also mounted against the under side of the chute or trough. The horizontal portion 16 of the chute or trough carrying the motor and shaft 45 and gearing just explained, including the shaft 42, is longitudinally slidable on the yoke 19, as hereinbefore explained, and as a consequence the shaft 45 is given sufficient length to permit maximum adjustment of the chute or trough without interfering with the operation of the motor or the driving parts thereof connected to the shaft 45. Above the gear 43 the shaft 42 has a sprocket disk 48 secured thereon and in all respects similar in construction to the disk 26 hereinbefore described, and it will be understood that the sprocket gear 43 will be suitably spaced from the lower or bottom portion of the discharge end by an interposed disk 49; and at this discharge end of the mechanism the plate 11 is also extended to cover the sprocket disk 48 and has an opening 50 therethrough to register with the diametrically opposite recesses of the said sprocket disk so that any dust or dirt that may be carried around to this part of the mechanism will find escape through the opening 50 and the said sprocket disk recesses. The plate 11 extends out far enough at the discharge end 38 to provide an overhanging ledge 51 for engagement by the conveying devices and to bring the endless conveying means in practical contact with the sprocket disk 48 which constitutes the driving disk; whereas the opposite similar disk 26 is simply a transmitting means for the power relatively to the rotating or revoluble feed plate 25.

The endless conveyer comprises an endless chain, cable or analogous device 52 and a plurality of flights 53 arranged at intervals and connected to the chain or cable. The chain or cable 52 travels lengthwise over the inclined and horizontal portions 17 and 16 of the chute or trough and also over the receiving end 18 and the discharge end 38, and the said cable or chain moves under the outwardly projecting or overhanging side edge portions of the supplemental bottom plate 11, as shown by Fig. 8, the chain or cable moving close to the opposite side edges of the channel iron 8. The preferred form of the flights is shown by Fig. 6, though it will be understood that other shapes might be adopted, and while this form of flight is preferred the invention is not limited to the use of any particular structure of flight and it is proposed to adopt such other configurations as may be found applicable for the purpose. As a strong flight structure, however, that illustrated by Fig. 6 has been found to be the best, and each flight consists of an outer angularly reduced end 54 and an inwardly projecting substantially rectangular carrying member 55, an under-cut or recess 56 being formed in the body 54 and practically in line with the lower edge of the member 55 to fit over the opposite side edges of the supplemental bottom plate 11 and the extensions of the latter respectively at the receiving and discharge ends of the mechanism. The lower edge of the member 55 which is horizontally straight travels in close engagement with the upper surface of the plate 11 and the extensions of the latter, and the recess 56 by its formation provides an inwardly projecting attaching member 57 which is recessed, as at 58, to receive a link of the chain belt 52 or a portion of an analogous endless conveying means; and coöperating with this securing member 57 is a fastening block 59 which has its inner edge also formed with a recess 60 of the same proportions and shape as the recess 58 to take over the outer side of the engaged link, and the link or a part of another analogous endless conveying means is secured by a screw-bolt or similar fastening 61 inserted through the block 59 into the securing member 57, the screw-bolt or fastening 61 having a flush fitting with the edge of the block in which it is inserted so as to avoid any wearing projection at this point. Each block 59 provides a means for engaging the sprocket recesses of the disks 26 and 48, and the lower edges of the body 54 and block 59 are coincident and a stable bearing for each flight is thus provided relatively to the main bottom 9 of the chute or trough. It will be seen that each flight has a double support at its lower portion; that is, against the bottom 9 and the plate 11, and is therefore reinforced in carrying its load. The endless chain or conveying means 52 is also shielded in its progress longitudinally over the chute or trough by moving under the overhanging portions of the side edges of the plate 11, and is also shielded under the opposite extensions of this plate at the receiving and discharge ends of the machine.

Adjacent to the receiving end 18 of the machine a foot lever 62 is applied and connected by a pivot member or block 63 to the bottom inclined portion 17 of the chute or trough and comprises a tread plate 64 at its outer free end and a fulcrum roller 65 to bear upon the ground near its inner fulcrumed end thereof, as clearly shown by Fig. 9. To the rear corner 66 of the bottom plate 22 a manually operable shifting lever 67 is fulcrumed, said lever being shaped to project upwardly and outwardly at an angle, as shown by Fig. 10. The lever 67 terminates at its upper end in a breast or body receiving yoke 68 whereby an operator may exert bodily pressure against the lever and shove or push the chute and receiving end 18 sidewise to dispose said receiving end in the best position relatively to the coal being loaded. Conversely, the lever 67 may be used to pull the chute and receiving end 18 in an opposite direction. Before manual shifting of the chute and receiving end 18 may be easily accomplished, the said receiving end and inclined portion of the chute is raised by the foot lever 62, the operator first placing his foot on the tread plate 64 and depressing the outer portion of the lever and through the latter raising the receiving end 18 and the adjacent inclined portion 17 of the chute. When the chute is thus raised and held the operator may then exert a pushing or pulling force on the lever 67 and change the position of the receiving end 18 as may be desired, the roller 65 of the foot lever 62 in contact with the ground giving an easy movement of the chute and receiving end during shifting movement thereof. The movement of the chute as just explained is also rendered easy and quickly responsive to manual force by reason of the mounting thereof on the support or trestle 15 as hereinbefore explained. When the adjustment of the chute desired has been made, pressure is relieved from the lever 62 and the receiving end 18 is lowered to and has a stable rest upon the ground. The foot lever 62 may also be advantageously used for vibrating the receiving end 18 and the chute by rapidly and successively depressing the outer end of the said lever and thereby shake up the coal or loose material to obtain a better feed on the receiving end.

The operation of the mechanism is as follows: The receiving end 18 of the chute and the latter are primarily manually adjusted to the best advantage relatively to the coal or loose material and the carrier or car to be loaded, and the motor 47 is then started. The coal or loose material falling or moving on the revoluble plate 25 is held and moves with the plate between the flights 53 and is carried around past the guard 36 without pulling resistance or strain on said flights, because the latter and plate revolve at the same rate of speed. The flights take the coal or loose material with full weight and strain only when the lower end of the inclined portion 17 of the chute is reached and the plate cleared by the flights, and the said flights then raise the coal or loose material upwardly through said portion of the chute to the horizontal portion 16 thereof and then to and off from the discharge end 13, the flights returning outside the flange or side 14 and then down to the receiving end 18. This operation is continuous as long as the motor is running and coal or loose material is deposited on the receiving end 18. Owing to the flights being assisted in taking the coal or loose material at the receiving end by the revoluble plate 25, the motive power necessary to practically actuate the machine may be materially reduced, and consequently a comparatively light and inexpensive motor may be used with advantage in minimizing the cost of production of machines of this class and in loading cars and conveying materials from one place to another and also facilitate manual adjustment of the machine as a whole by decreasing the weight thereof. The improved machine is adapted for loading and conveying all kinds of loose material and articles, but is particularly applicable for use in mines and especially in taking coal from low cuts and conveying the same to cars. When used in a mine the machine may be readily installed in working position on the ground or floor of the cut without requiring laying of track rails or the use of bracing devices.

The extension 40 at the discharge end 38 of the machine is formed with an opening 69 at one side of the longitudinal center of the machine, said opening serving as an outlet for the dust or small particles of material that may be drawn around to said opening by the flights 53.

What is claimed as new is:—

1. In a conveying and loading mechanism, a single rear support, a chute having a lower horizontal inlet extremity free to move on the ground or floor-supporting surface therefor, an intermediate upwardly inclined portion, a horizontal outlet extremity engaging said support, the chute being structurally continuous from end to end and laterally shiftable to change the angle thereof relatively to said support and also bodily shiftable in a longitudinal direction on the support, a single revoluble receiving member mounted on said horizontal inlet extremity, and an endless conveyer movable lengthwise over the upper surface of the chute and around and over the receiving member and provided with a plurality of flights which radially extend over the member to the periphery of the latter, the conveyer with its flights and the receiving member moving at the same rate of speed.

2. In a conveying and loading mechanism, a single rear support, a chute continuous from end to end and having a lower flat inlet extremity and a rear horizontal outlet extremity held by said support which serves as the sole means of sustaining the mechanism in its various operative positions, a rotatable receiving disk mounted on said inlet extremity and fully exposed at the front and side portions of the inlet extremity, and a conveyer movable over the full length of the chute and also around and closely over the receiving disk, the chute being laterally shiftable to change its angle relatively to the support and also bodily shiftable in opposite longitudinal directions on the support.

3. In a conveying and loading mechanism, a chute having movable receiving and conveying devices mounted thereon, a single supporting device for the chute engaged by the rear portion of the latter, the front extremity of the chute being arranged to rest on the ground surface or a floor, and means on the supporting device and also engaged by the chute for permitting the latter to be shifted laterally at different angles and also bodily in opposite longitudinal directions relatively to the supporting device.

4. In a conveying and loading mechanism, a chute having a lower front receiving extremity which loosely engages the ground or a floor surface and fully open at opposite sides and at the front, conveying means movable over the chute and its receiving extremity, and a single supporting device engaged by the rear portion of the chute, the chute being laterally shiftable to vary its angle to the supporting device and also bodily shiftable longitudinally on the said supporting device.

5. In a conveying and loading mechanism, a chute having a lower inlet end arranged to directly and loosely engage the ground or floor surface on which it rests and provided with means for moving material onto and upwardly thereover, and a supporting device on which the upper rear portion of the chute has loose bearing to permit the chute to be bodily shifted in opposite longitudinal directions, the chute also being laterally shiftable at an angle to the supporting device, the latter serving as the sole supporting means for the chute and its conveying accessories.

6. In a mechanism of the class specified, a chute having a discharging end, a conveyer having flights attached thereto and projecting vertically above the bottom of the chute and movable over the latter and around the discharging end, and a guard extending at an angle over and projecting above the discharging end of the chute and having an opening in the lower portion to provide a clearance for the flights of the conveyer and also to permit the dust and small particles of material to pass thereunder, the guard preventing the larger material from working back and insuring a delivery thereof from the discharge end.

7. In a mechanism of the class specified, a chute having a receiving end, a sprocket disk in said end, a revoluble feed plate secured to said disk, a conveyer having endless means and devices movable over the chute and the said plate, the chute having an extended portion over the disk, and a filling block behind the disk under said extended portion to prevent material from working behind the disk.

8. In a mechanism of the class specified a chute having a receiving end, a sprocket disk on said end, the chute having an extension over said sprocket disk and forming an overhanging ledge relatively to the disk, a conveyer having an endless device movable under said ledge in engagement with the disk and flights movable over the chute and receiving end, and a filling block under the said extension in rear of the disk to prevent passage of material in the rear of the disk.

9. In a mechanism of the class specified, a chute having a receiving end, a sprocket disk with recesses at opposite points opening through the top of the disk, the chute having an extension over the disk with an opening therein to register with the recesses of the sprocket disk, a cap plate on the extension over the opening of the latter and provided with outlets registering with said latter opening, and a conveyer having an endless device engaging the sprocket disk and flights movable over the chute and adjacent to the disk, the dust and dirt passing away from the endless device upwardly through the disk recesses and openings in the extension and cap plate.

10. In a mechanism of the class specified, a single support having a pivotal member thereon, and a chute provided with receiving and discharging ends and having a conveyer running throughout the length thereof from the receiving to the discharging end, the chute having a portion thereof loosely bearing on the pivotal member of the support and shiftable longitudinally on said member and also laterally through the medium of the pivotal member, the support serving as the sole means for maintaining the intermediate portion of the chute in operative position.

11. In a mechanism of the class specified, a supporting trestle freely movable from one point to another and carrying a pivotal member at its upper portion, a chute loosely engaging and longitudinally shiftable on the pivotal member and having a depressed receiving end and an elevated discharging end, a conveyer movable through the chute and over the receiving and discharging ends thereof, and means connected to the lower receiving end of the chute for shifting the latter in opposite sidewise directions and also for raising and vibrating the said receiving end.

In testimony whereof I have hereunto set my hand in presence of a subscribing witness.

FRANCIS K. HOLMESTED.

Witness:
CHAS. S. HYER.

Copies of this patent may be obtained for five cents each, by addressing the "Commissioner of Patents Washington, D. C."